United States Patent
Conlon

(10) Patent No.: US 8,831,383 B2
(45) Date of Patent: Sep. 9, 2014

(54) ENHANCED TECHNIQUES FOR VISUAL IMAGE ALIGNMENT OF A MULTI-LAYERED DOCUMENT COMPOSITION

(75) Inventor: Paul R. Conlon, South Bristol, NY (US)

(73) Assignee: Xerox Corporation, Norwalk, CT (US)

( * ) Notice: Subject to any disclaimer, the term of this patent is extended or adjusted under 35 U.S.C. 154(b) by 1137 days.

(21) Appl. No.: 12/330,967

(22) Filed: Dec. 9, 2008

(65) Prior Publication Data

US 2010/0142851 A1 Jun. 10, 2010

(51) Int. Cl.
*G06K 9/60* (2006.01)
*G06K 9/36* (2006.01)
*G09G 5/00* (2006.01)
*G06T 11/60* (2006.01)

(52) U.S. Cl.
CPC ............................ *G06T 11/60* (2013.01)
USPC ............... 382/302; 345/619; 382/284

(58) Field of Classification Search
None
See application file for complete search history.

(56) References Cited

U.S. PATENT DOCUMENTS

| 7,998,485 | B2* | 8/2011 | Nauwynck et al. | 424/192.1 |
| 2008/0246759 | A1* | 10/2008 | Summers | 345/420 |
| 2009/0012433 | A1* | 1/2009 | Fernstrom et al. | 600/593 |

OTHER PUBLICATIONS

Photoshop CS3, Apr. 16, 2007, Screen shots and Help file.*
Photoshop CS3, Apr. 16, 2007, modified Screen shots.*
Yusuf, Digital Panning, "www.photos-of-the-year.com/panning/", Oct. 5, 2008.*

* cited by examiner

*Primary Examiner* — Randolph I Chu

(57) ABSTRACT

A system and method for enabling visual processing of selected objects in a complex document. The system and method enhance the visibility of certain selected objects or layers in a document, and attenuates the visibility of the remaining objects or layers. This is accomplished by selecting a portion of an input image according to a pre-determined criteria, applying a first image modification scheme to the selected portion of the image to produce a first modified portion of the image, applying a second image modification scheme to a non-selected portion of the image to produce a second modified portion of the image, and displaying the image as a combination of the first modified portion and the second modified portion.

21 Claims, 3 Drawing Sheets

ENHANCED TECHNIQUES FOR VISUAL IMAGE ALIGNMENT OF A MULTI-LAYERED DOCUMENT COMPOSITION

BACKGROUND

This disclosure is directed to a method and system for processing an image in an image forming device. Specifically, the system and method are directed to processing complex images having multiple layers.

Pre-press images are draft images that are to be sent to a printer or other output device, and require editing before a final product is produced. In a pre-press mode, images require editing before production. There are conventional software programs that are applied to single layer images. An example of such a program is, for example, Adobe Photoshop™. These programs suffer from certain disadvantages and are often difficult to use when editing complex documents.

For complex images, it can be difficult to satisfactorily modify the complex image with all portions of the complex image in full view. This difficulty is particularly acute when modifying an image in which the image is a composite image having multiple layers that are either all in full view, or with some layers that are not in view at all because, for example, additional features or layers of the image that are in full view obscure the other layers. When attempting to manipulate a portion of the image, other layers that have been, or otherwise will be separately manipulated, can be distracting and interfere with efficient and accurate modification of the image. This shortfall can be seen in employing programs that enable a user to simply turn on or turn off the various layers of an image, and can inhibit the ability to align portions of the image with one another.

Another example of a modification scheme for aiding in editing an image is known, for example, in AutoCAD 2000™. This program enables various layers of a complex document to be labeled with different names and manipulated. It can be difficult to align portions of the image with other portions because a reference point is either muddled by the presence of extraneous portions of the image or not shown at all. Such systems only enable a user to either view or not view a particular layer, and to lock or unlock a particular layer or layers. Layers can either be turned on or off, or locked or unlocked, and can be manipulated with or without all of the other layers present. However, such systems do not manipulate the layers that are not to be edited to make the desired portion of the image that is to be edited more pronounced, and easily viewable so that, for instance, layers can be aligned using the portion that is not to be edited as a reference point.

SUMMARY

In view of the above shortfalls, it would be advantageous to provide a capability by which an image can be manipulated to aid in the editing of an image by modifying some features of the image that are not to be currently manipulated that would be otherwise distracting and interfere with efficient and accurate modification of the image in an image forming device.

There is a need to develop a system and method to allow the manipulation of an image in an image forming device for editing where the desired portion of an image to be edited is shown in full view and is visually differentiated from other portions of an image, which also remain in full view during the editing. In this manner, currently-manipulated portions of an image are made differentiable when compared with other portions of the image that are modified. The other portions of the image are modified so that the portions of the image that are not to be currently manipulated can be viewed at the same time, but are modified to be less distracting. This need is based on providing the ability to allow editing or alignment of a desired portion of an image in a correct or similar manner in relation to the portion of the image that is not edited. Further, it is desirable to enable a means for navigation through multiple layers of a composite image with a certain degree of relative distance between the layers so as to enable a perspective view that may aid in the editing process.

In various exemplary embodiments, the systems and methods according to this disclosure may provide a capability by which an image may be processed in an image forming device by selecting a portion of an input image according to a predetermined criteria. The predetermined criteria may be any one, or combination, of visual selection or non-visual selection of a portion of the image. Visual selection may include, but not be limited to, 2D and/or 3D bounding boxes or regions having any shape including, but not limited to, a rectangle, square, circle, oval, triangle, cube, sphere, pyramid, or any other polygonal shape, and the like, or a free-form visual selection wherein a portion of the image is visually selected. The non-visual selection may include, but not be limited to, any object or image attribute, type, class, or the like. Once selected, first image modification scheme may be applied to the selected portion of the image to produce a first modified portion of the image, and then a second image modification scheme may be applied to a non-selected portion of the image to produce a second modified portion of the image. The resulting image may then be displayed as a combination of the first modified portion and the second modified portion. An objective is to make the first modified (selected) portion standout from the second modified (non-selected) portion to enhance distinction and facilitate detailed editing of the image.

In various exemplary embodiments, the image may be a composite image that includes multiple layers, and the multiple layers may be managed within a list. The list for managing the multiple layers of the image may be of any type that may aid in the management of the multiple layers such as, for example, a hierarchical list with a tree-like structure. Further, within the list, at least one layer of the multiple layers may be labeled as a particular group so that group layers may be modified in an identical manner. At least one layer of the multiple layers in the list may be selected to modify. Navigation through the multiple layers of the composite image may be controlled through an on-display control device such as a graphical user interface including, for example, a slider and/or dial.

In various exemplary embodiments, the first and/or second modification scheme may include one or more of adjusting the focus, color, brightness, edgeline density, magnification, or any other image processing techniques that are native to a system in which the systems and methods of this disclosure may be "plugged-in," for example, of the selected or non-selected portions of the image. For layered images, types and relative degrees of modification may be based on the relative distance between the selected portion and the non-selected portion of the image so as to enable some perspective with regard to how the image is displayed.

These and other features and advantages of the disclosed systems and methods, are described in, or apparent from, the following detailed description of various exemplary embodiments.

BRIEF DESCRIPTION OF THE DRAWINGS

Various exemplary embodiments of disclosed systems and methods for enhanced visual image alignment of a complex document composition will be described, in detail, with reference to the following drawings wherein.

DETAILED DESCRIPTION OF EMBODIMENTS

The following embodiments illustrate examples of systems and methods for enabling convenient visual processing of selected objects in a complex document in an image forming device by enhancing the visibility of certain selected objects or layers in the complex document, and/or otherwise attenuating the visibility of the remaining objects or layers. The following description of various exemplary embodiments for enabling visual processing of selected objects in a complex document in an image processing system and/or in an image forming device may refer to one specific type of image forming device, such as, for example, an electrostatic or xerographic image forming device, and discussion of various terms related to image correction within such an image forming device, for the sake of clarity, and ease of depiction and description. It should be appreciated, however, that, although the systems and methods according to this disclosure may be applicable to such a specific application, the depictions and/or descriptions included in this disclosure are not intended to be limited to any specific application. Any system and/or method for image forming and image display that may advantageously apply the visual processing methodologies and/or image rendering schemes described in exemplary manner in this disclosure are contemplated. Image displays may include, for example, any means for displaying electronic data such as displaying an image on a CRT, LCD, OLED, OELD, Plasma, or the like.

In referring to, for example, image forming devices as this term is to be interpreted ill this disclosure, such devices may include, but are not limited to, copiers, printers, scanners, facsimile machines, xerographic image forming devices, and/or any other now known or later-developed system or device for producing, reproducing and/or potentially transmitting or receiving high quality monochrome and/or color images.

Exemplary embodiments according to this disclosure may provide systems and methods for enabling convenient visual processing of selected objects in a complex document in an image forming device. This visual processing may be facilitated by enhancing the visibility of certain selected objects or layers in a document, and/or otherwise attenuating the visibility of the remaining objects or layers. Examples of visual enhancement and/or attenuation functions include, but are not limited to, adjusting brightness and/or contrast, adding filtering or outlining, and/or modifying focus or scaling, or any combination of such functions. This disclosure also proposes the use of any form of hierarchical structure, such as, for example, a tree structure, to facilitate group processing of images, portions of images, layers in images, and the like.

Figures 1, 2:
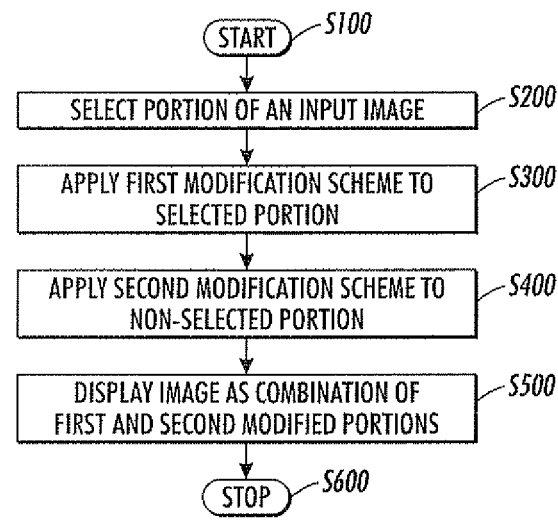
FIG. 1 illustrates an exemplary flowchart of a method for processing an image according to this disclosure.
FIG. 2 illustrates an exemplary hierarchical list of multiple layers of a composite image.

FIG. 1 illustrates a flowchart of an exemplary embodiment of a method for processing an image. As shown in FIG. 1, operation of the method commences as step S100 and proceeds to step S200.

In step S200, a portion of an input image is selected according to a predetermined criteria. The predetermined criteria may be any one, or combination, of visual selection or non-visual selection of a portion of the image. Visual selection may include, but not be limited to, 2D and/or 3D bounding boxes or regions having any shape including, but not limited to, a rectangle, square, circle, oval, triangle, cube, sphere, pyramid, or any other polygonal shape, and the like, or a free-form visual selection wherein a portion of the image is visually selected. The non-visual selection may include, but not be limited to, any object or image attribute, type, class, or the like. Such selection may be based upon preferences such as which portion of the image is to be edited, and/or which portion of the image is not to be edited, in the image forming device. The predetermined criteria may be any option by which a user may desire to restrict which portion of the image is to be edited. The options may be preset and/or customizable. The predetermined criteria may include, but not be limited to, for example selecting text, images, foreground or background; selecting a layer or series of layers by name or number; selecting a layer or portions of the image by color, shape, lines meeting at a certain angle or range of angles, a specific line thickness or a range of line thicknesses; or the like. The predetermined criteria may also be customized such that the user may consider each image individually and decide types of criteria that are not included in the preset list of predetermined criteria and develop a customized scheme. As such, the options for predetermined criteria may involve a series of fields in which a user can input information that the user regards should be distinguishable with respect to a particular image and the method may search and select portions of the image based on the input information. These selections and/or predetermined criteria may be stored or otherwise pre-programmed within the image forming device. In various embodiments, an opportunity may be provided for a user to manipulate the selection or the predetermined criteria. Operation of the method continues to step S300.

In step S300, a first image modification scheme may be applied to the selected portion of the image to produce a first modified portion of the image. Such action may include, but not be limited to, for example, applying a modification scheme that adjusts the focus of an image portion. The focus may be adjusted such that what is displayed becomes represented by the selected portion being sharpened in focus which the non-selected portion becomes blurred. When applied to a stack of layers in an image, such as multiple layers in a composite image, a particular image layer may be focused upon. Based on the relative distance between layers, other layers in the image may vary in terms of levels of blurring. This relative variance in degree of modification may potentially apply to other concurrent or alternative image processing techniques such as, but not limited to, brightness or color variation, edge lining, magnification, or any other image processing techniques that are native to a system in which the systems and methods of this disclosure may be "plugged-in," for example, to enhance the overall effect of differentiating specific portions of an image, in automated manner, in an image forming device. Operation of the method continues to step S400.

In step S400, a second image modification scheme may be applied to a non-selected portion of the image to produce a second modified portion of the image. Such action may include, but not be limited to, for example, applying a modification scheme that adjusts the focus of the image portion or otherwise that may potentially apply other concurrent or alternative image processing techniques such as brightness or color variation, edge lining, or the like, generally muting the non-selected portion to enhance the overall variance effect between portions of the image in the image forming device. Operation of the method continues to step S500.

In step S500, the image is displayed as a combination of the first modified portion and the second modified portion resulting from operation of the image forming device. This enables the first modified portion to be more distinguishable from the second modified portion to aid in the editing of the image. Some features of the image can be distracting and interfere with efficient and accurate modification of the image in the image forming device, but viewing a combination of the first modified portion and the second modified portion can be helpful when editing the image to correct alignment of the first modified portion with the second modified portion, for example, because the second modified portion, while present in the display, does not detract from the relative importance of the portion that is to be edited. Operation of the method continues to step S600 where operation of the method ceases.

It should be appreciated that images for processing in an image forming device may be obtained via means such as scanning, RIPping, or loading from an extraneous file source, or the like. It should further be appreciated that the image may be of any image type, such as a simple image or any more complex image, such as a composite image or image having multiple layers. The method may be used, for example, to view, edit, zoom, proof, visually align portions of the image, or to perform any other desired image manipulation.

FIG. 2 illustrates an exemplary list of multiple layers 20 in a hierarchical structure to manage multiple layers in a complex image. The layers may be selected individually, or in combination with other layers, and assigned to a specific group 22. A file archival utility 24 is shown that may enable each element of the complex image to be selectable. In this context, it would limit, for example, viewing, editing, zooming, modifying, alignment, or any other modification to significant image portions or layers that are selected individually, or in combination with others, for a particular group.

It should be appreciated that grouped images may be modified identically with other images that are part of the group and may or may not be in full view. This serves to limit the complexity of the visual scene to essential images that are desired for editing or modification. Images or image portions can be included, or excluded, simply and efficiently. The image ordering for alignment may or may not be the same as for rendering of the image.

Figure 3:
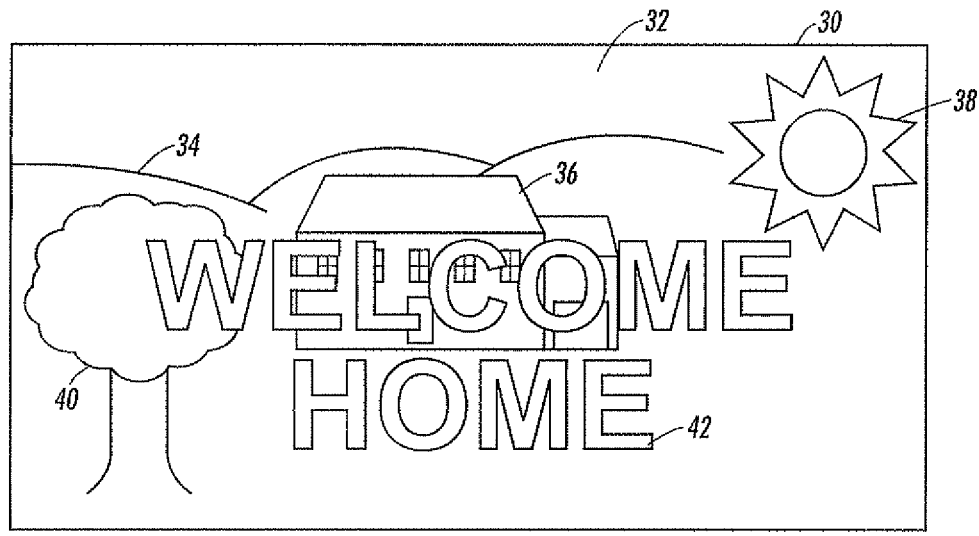
FIG. 3 illustrates an exemplary composite image having multiple layers.

FIG. 3 illustrates an exemplary composite image 30 having multiple layers. The layers are, for example, a background 32, foreground 34 having sub-layers, comprising, for example, a house 36, sun 38, tree 40, and text 42, each presented in the complex image or an individual layer.

Figure 4:
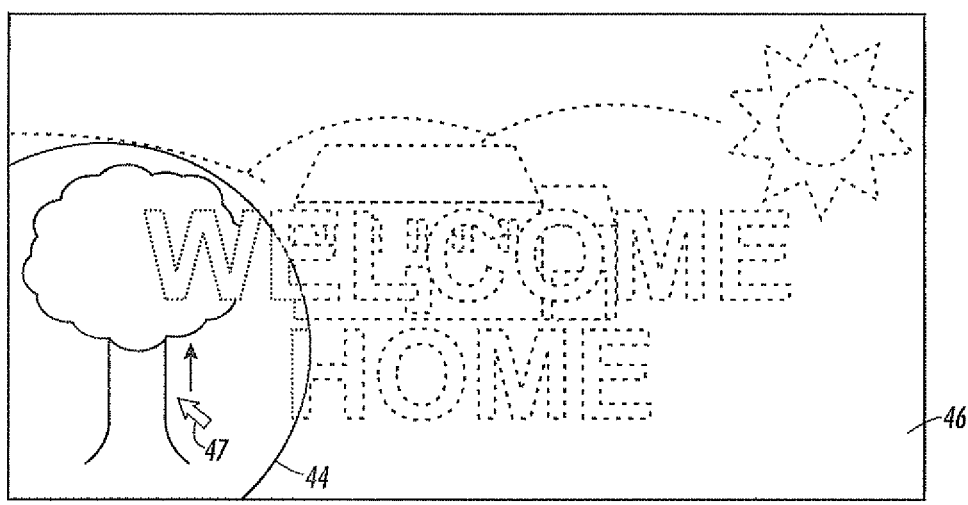
FIG. 4 illustrates an exemplary composite image modified with a selected portion.

FIG. 4 illustrates a selected portion 44 of the example composite image 30 in FIG. 3, that is modified so that it is sharper in focus, and the non-selected portion 46 of the example composite image 30, in FIG. 3, is modified so that it is blurred. The tree layer 40 of the exemplary image 30 shown in FIG. 3, which is not attenuated because it is the selected portion, is realigned with the blurred images using an on-display control selecting means 47. It should be appreciated that it is easier to work on a selected, non-attenuated portion, or layer, because other layers or portions are modified, or attenuated, and are therefore less distracting.

Figure 5:
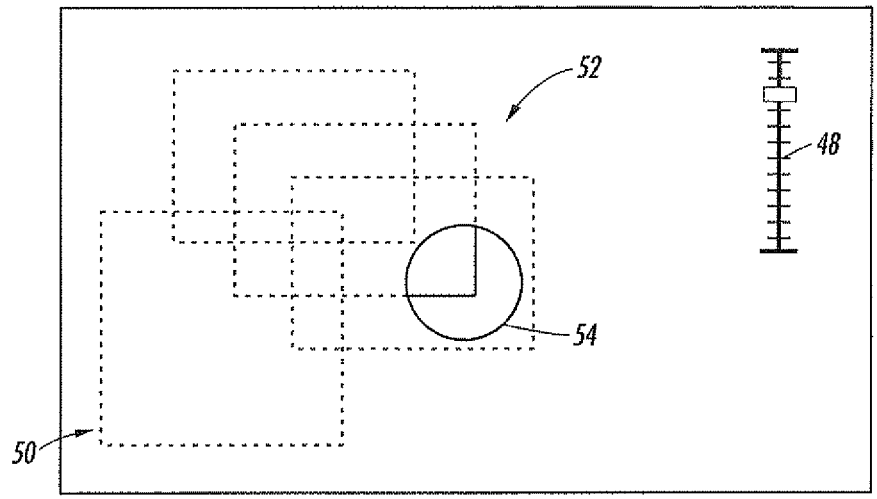
FIG. 5 illustrates an exemplary composite image with an on-screen control device.

FIG. 5 illustrates an exemplary on-display navigation device 48 that is a slider which adjusts the zoom of the selected portion 54 through multiple layers 50 in a composite image 52. It should be appreciated that the on-display navigation device 48 can be of any type such as the exemplary slider, or a dial, or any other scheme that may aid in the navigation of an image in the image forming device. It should also be appreciated that navigation can be controlled to alter any of, for example, the position of the image on the display, the position and size of the selected portion or viewing area, the zoom level, the depth, or any other desirable alteration to a standard view of an image. The view can also be changed to enable more or less layers to the viewable in the selected portion via use of the on-display navigation device.

Figure 6:
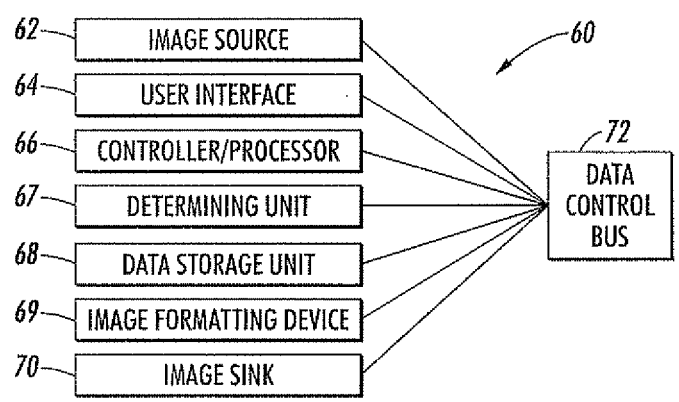
FIG. 6 illustrates an exemplary system for processing an image according to this disclosure.

FIG. 6 illustrates a block diagram of an exemplary embodiment of a system 60 for enabling convenient visual processing of selected objects in a complex document in an image forming device. As shown in FIG. 6, an exemplary system 60 may include an image source 62, a user interface 64, a controller/processor 66, a determining unit 67, one or more image data storage units 68, an image formatting device 69, an image sink 70, and a data/control bus 72 that connects all of the various components of system 60.

In various exemplary embodiments, input images obtained via the image source 62 may be manipulated by the system 60 based on predetermined and/or adjustable parameters such that an output image formatting device 69 may properly format output image data in a manner to be compatible with the image sink 70. The image data output to the image sink 70 will have a certain number of factors, including a set of predetermined and/or adjustable image rendering parameters within the system 60.

The image source 62, it should be recognized, may be any form of image receiving unit in, or associated with, an image forming device. The image source 62 may include, for example, an image scanning device, an image digital data storage device, and a digital still or video camera, and/or a locally or remotely located computer and/or data manipulation workstation, or any other now known or later-developed device that is capable of generating, or reproducing, the electronic digital source image data. The image source 62 may be integrated with, or connected remotely to, the image forming device. The image source 62, if a separate device or unit from the image forming device, may be connected to the image forming device by either a direct or network data communication link, including any one or more of a wired, wireless, optical and/or like link. The image source may include a capability to store input image data. Alternatively, the system 60 may internally store input image data and, for example, an image storage data unit 68.

A user interface 64 may be provided in the form of, for example, a graphical user interface associated with the image forming device, in order, where appropriate, to query a user, and/or receive user input, regarding variable rendering parameters for adjustment, and/or visual processing parameters, within the system 60 that may facilitate improved image production and/or reproduction, and may enhance the visual processing of selected objects in a complex document. Such a user interface 64 may afford a user an opportunity to modify and/or select a portion of a simple or complex image. The user interface 64 may also be an output for displaying a combination of the first modified and second modified portions of the image. It should be appreciated that the user interface 64 may also comprise, for example, an additional data storage medium and compatible digital data storage medium reading device, or a locally or remotely-located computer and/or data manipulation workstation that may be in data communication with the exemplary system that may be in data communication with the exemplary system 60.

A controller/processor 66 may be provided to control overall operation of the system 60, or otherwise to specifically control individual functions related to visual processing of selected objects in the complex document, to query databases stored within one or more data storage units, and to carry out operations based on determinations made in other units within the system 60. The controller/processor 66 may process image data and other monitored parameters received, for example, from one or more of the other units within the system 60 to aid in operation of the image forming device that will support the image processing system based on, for example, a status and/or condition of one or more components within the image forming device.

Data storage units such as that depicted as an image data storage unit 68 may be provided to store data regarding operating parameters of the image forming device that do not change over time, or that are subject to drift based on a condition of one or more components within the image forming device. As such, data storage unit 68 may additionally store, for example, rendering parameter data or other information regarding processing an image.

A determining unit 67 may be provided to execute a determination by which, based on one or more predetermined criteria regarding optimally enhancing the visibility of certain selected objects or layers in the document, attenuating the visibility of the remaining objects or layers in the document, automatically. The determining unit 67 may select a portion of the image based on the predetermined criteria that is input and apply a first modification scheme to the selected portion and a second modification scheme to the non-selected portion of the image. The predetermined criteria may be any one or more selections provided in a preset list or a customizable criteria determined by the user that is input to the determining unit 67. The predetermined criteria may be any option that a user may desire to restrict which portion of the image is to be edited. The predetermined criteria may be any one, or combination, of visual selection or non-visual selection of a portion of the image. Visual selection may include, but not be limited to, 2D and/or 3D bounding boxes or regions having any shape including, but not limited to, a rectangle, square, circle, oval, triangle, cube, sphere, pyramid, and the like, or a free-form visual selection wherein a portion of the image is visually selected. The non-visual selection may include, but not be limited to, any object or image attribute, type, class, or the like. The predetermined criteria may include, but not be limited to, for example selecting text, images, foreground or background; selecting a layer or series of layers by name or number; selecting a layer or portions of the image by color, shape, lines meeting at a certain angle or range of angles, a specific line thickness or a range of line thicknesses; or the like. The predetermined criteria may also be customizable such that the user may consider each image individually and decide what types of criteria are not included in the preset list of predetermined criteria and develop a customized scheme. As such, the options for predetermined criteria may involve a series of fields in which a user can input information that the user regards should be distinguishable with respect to a particular image and the method may search and select portions of the image based on the input information. The determining unit 67 may suggest a predetermined criteria, or modification scheme to optimize the anticipated effect that the user is attempting to accomplish. The determining unit 67 may apply the first and second modification schemes in a manner that is relative to the distance between the selected and non-selected portions of the image, or the relative distance between the layers within the selected and non-selected portions of the image. Such an action may include, but not be limited to, for example, applying a modification scheme that adjusts the focus of the image portion or otherwise that may potentially apply other concurrent or alternative image processing techniques such as brightness or color variation, edge lining, or the like, to enhance the overall effect of the image forming device. The determining unit 67 may then output the image as a combination of the first modified portion and the second modified portion. The determining unit 67 may consider whether the image after applying the modification schemes, is overly complicated, and may either automatically reduce the complexity of the resultant image, or consult the user on whether the user wishes to reduce the complexity of the resultant image. The determining unit 67 may turn off, or hide, a portion or portions of the image to reduce the complexity of the resultant image either automatically, or at the user's request.

The systems and methods according to this disclosure contemplate an image sink 70 that is an output image receiving medium upon which a hard-copy image may be formed. Other image sinks 70, however, to include, for example, a digital display for review of an output image, and evaluation of a processed image, may be employed.

It should be appreciated that although depicted as a generally integral system 60 in FIG. 6, each of the devices and/or units depicted as internal to, or alternatively externally connected to, the exemplary system 60 could be either units and/or capabilities internal to an image forming device, or individually, or in combination, attached as separate units by any path which facilitates data communication such as, for example, digital data communication of image data information, and coordination, between such units and/or devices. Such data communication may be undertaken by, for example, one or more of a wired, a wireless, an optical, or other like connection, either individually or via some form of network communication between the individual devices and/or components and the overall system 60 supporting image formation in an image forming device.

Any of the data storage units depicted, or alternately described above, may be implemented using an appropriate combination of alterable, volatile or non-volatile memory, or non-alterable, or fixed, memory. The alterable memory, whether volatile or non-volatile, may be implemented using one or more of static or dynamic RAM, or for example, any computer-readable type media and compatible media reader, a hard drive, a flash memory, or any other like memory medium and/or device. Similarly, the non-alterable or fixed memory may be implemented using any one or more of ROM, PROM, EPROM, EEPROM, optical or OM disk such as, for example, CD ROM, DVD ROM, or other disk-type media and compatible disk drive, or any other like memory storage medium and/or device.

It should be appreciated that, given the required inputs, to include, but not be limited to, appropriate databases, as generally described above, and/or inputs regarding differing monitoring capabilities within, or in communication with, the exemplary system 60, software algorithms, hardware/firmware circuits, or any combination of software, hardware, and/or firmware control elements may be used to implement the individual devices and/or units in the exemplary system 60.

The computations necessary to establish and to determine selection and/or adjustment of rendering parameters such as, for example, selecting a portion to modify, and processing the image, based on associated parameters, may be implemented with a circuit in the image forming device itself. Alternatively, such computations may be performed on a programmable general purpose computer, a special purpose computer, a programmed microprocessor or microcontroller, or some form of program digital signal processor, peripheral integrated circuit element ASIC or other integrated circuit, or hard-wired electronic or logic circuit such as a discrete element circuit, a programmable logic device such as a PLD, PLA, FGPA or PAL or the like, or may even be manipulated through manual adjustment of one or more of the operating parameters, or coefficients that may be associated with one or more of the operating parameters.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. A method for processing an image comprising:
providing the image that comprises a composite image comprising a first layer and a second layer;
selecting automatically by a determining unit only a portion of the image, comprising the first layer, according to a predetermined criterion comprising a customized scheme, wherein the customized scheme comprises a preset list of predetermined criteria based information that is input by a user into a series of fields that the user regards as distinguishable with respect to a particular image;
applying a first image modification scheme to the portion of the image that is selected, which includes the first layer of the image, to produce a first modified portion of the image;
applying a second image modification scheme to a non-selected portion of the image, which includes at least one layer other than the first layer in the image, to produce a second modified portion of the image, the second image modification scheme being different from the first image modification scheme; and
displaying the image as a combination of the first modified portion and the second modified portion, wherein the first modified portion is sharper in focus as compared to the portion of the image that is selected, wherein a degree of modification for each of a plurality of multiple layers in the first image modification scheme is determined based upon a relative distance between the each of the plurality of the multiple layers and the first layer so that the each of the plurality of the multiple layers which have different distances from the first layer have differing degrees of modifications.

2. The method of claim 1, wherein at least one of the first image modification scheme and the second image modification scheme comprises an image processing technique.

3. The method of claim 2, wherein the image processing technique comprises at least one of: adjusting a focus, adjusting a color, adjusting a brightness, adjusting an edgeline density, or adjusting a magnification.

4. The method of claim 3, wherein the method is pluggable into an external system and the image processing technique further comprises any image processing technique that is native to the external system.

5. The method of claim 1, wherein the plurality of the multiple layers is managed within a data structure.

6. The method of claim 1, wherein navigation through the plurality of the multiple layers of the composite image is controlled through an on-display control device.

7. The method of claim 1, wherein at least one layer of the plurality of the multiple layers is labeled as a particular group to modify grouped layers in an identical manner.

8. The method of claim 6, wherein the on-display control device comprises a graphical user interface.

9. The method of claim 5, wherein the data structure is a hierarchical list of the plurality of the multiple layers, and the at least one layer is selected from the hierarchical list.

10. A system for processing an image comprising:
a processing unit that receives the image that comprises a composite image comprising a first layer and a second layer, and receives a selection of only a portion of the image, comprising the first layer, according to a predetermined criterion;
a determining unit that automatically selects the portion of the image according to the predetermined criterion comprising a customized scheme, wherein the customized scheme comprises a preset list of predetermined criteria based information that is input by a user into a series of fields that the user regards as distinguishable with respect to a particular image;
a modification unit that applies a first image modification scheme to the portion of the image that is selected based on the predetermined criterion, which includes the first layer of the image, to produce a first modified portion of the image and applies a second image modification scheme to a non-selected portion of the image, which includes at least one layer other than the first layer in the image, to produce a second modified portion of the image; and
a display that displays the image as a combination of the first modified portion and the second modified portion, wherein the first modified portion is sharper in focus as compared to the portion of the image that is selected, wherein the image is a composite image that comprises a plurality of multiple layers, wherein a degree of modification of each of the plurality of the multiple layers in the first image modification scheme is determined based upon a relative distance between the each of the plurality of the multiple layers and the first layer so that the each of the plurality of layers which have different distances from the first layer have differing degrees of modifications.

11. The system of claim 10, wherein at least one of the first image modification scheme and the second image modification scheme comprises an image processing technique.

12. The system of claim 10 further comprising a xerographic device.

13. The system of claim 11 wherein the image processing technique comprises at least one of: adjusting a focus, adjusting a color, adjusting a brightness, adjusting an edgeline density, or adjusting a magnification.

14. The system of claim 13, wherein the system is pluggable into an external system and the image processing technique further comprises any image processing technique that is native to the external system.

15. The system of claim 10, wherein the plurality of the multiple layers is managed within a data structure.

16. The system of claim 10, wherein navigation through the plurality of the multiple layers of the composite image is controlled through an on-display control device.

17. The system of claim 10, wherein at least one layer of the plurality of the multiple layers is labeled as a particular group to modify grouped layers in an identical manner.

18. The system of claim 16, wherein the on-display control device is a graphical user interface.

19. The system of claim 15, wherein the data structure is a hierarchical list of the plurality of multiple layers, and the at least one layer is selected from the hierarchical list.

20. The method of claim 1, wherein the second modified portion is blurred as compared to the non-selected portion.

21. The system of claim 10, wherein the second modified portion is blurred as compared to the non-selected portion.

* * * * *